W. T. BOYD.
HOSE COUPLING.
APPLICATION FILED MAR. 16, 1911.
1,007,326.
Patented Oct. 31, 1911.
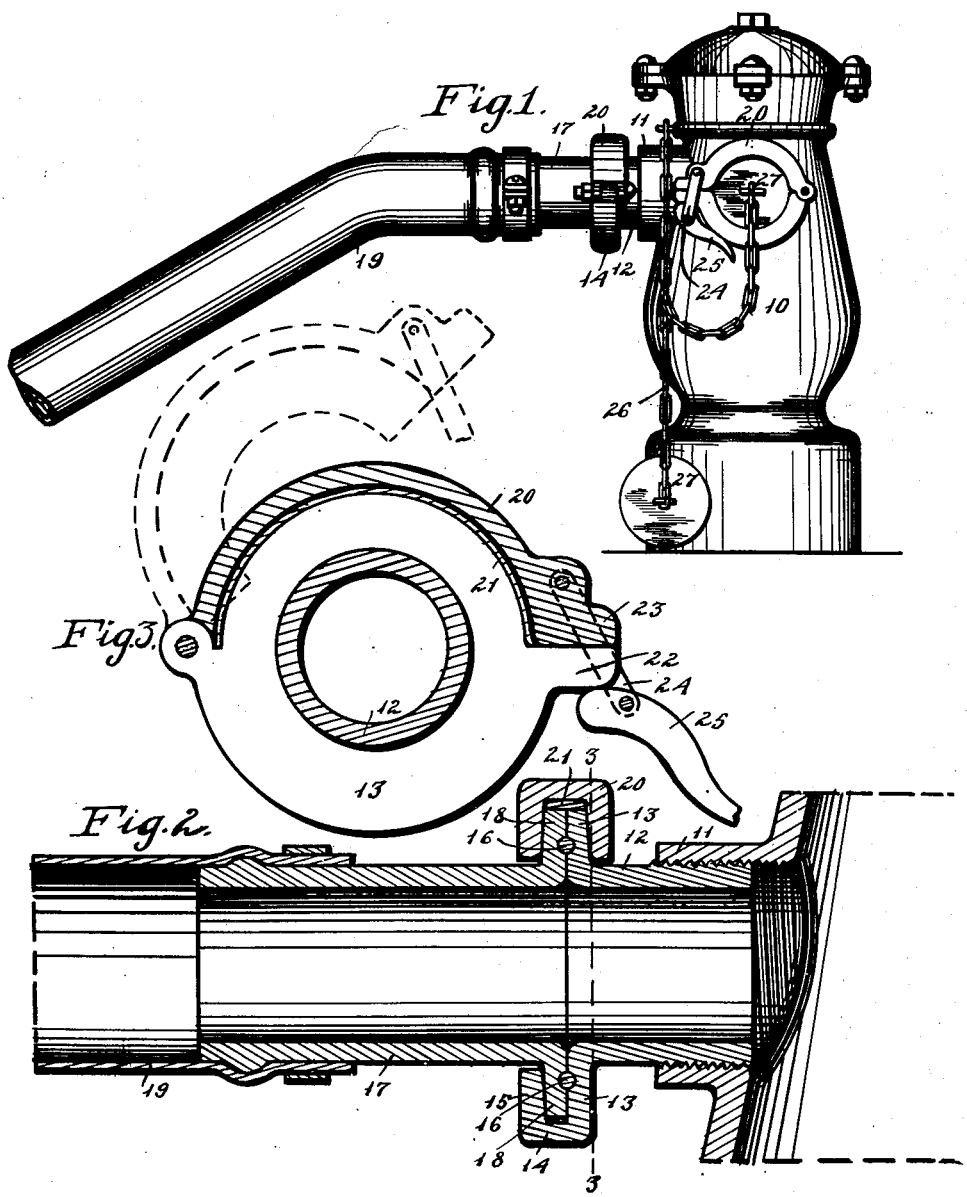

UNITED STATES PATENT OFFICE.

WILLIAM T. BOYD, OF OTTUMWA, IOWA.

HOSE-COUPLING.

1,007,326.

Specification of Letters Patent.  Patented Oct. 31, 1911.

Application filed March 16, 1911. Serial No. 614,969.

*To all whom it may concern:*

Be it known that I, WILLIAM T. BOYD, a citizen of the United States, residing at Ottumwa, in the county of Wapello and State of Iowa, have invented a certain new and useful Hose-Coupler, of which the following is a specification.

The object of my invention is to provide a hose coupling device of extremely simple, durable and inexpensive construction by which a hose may be connected with a hydrant quickly and easily without the use of a wrench or other tools.

A further object of my invention is to provide such a device by which the coupling joint is made water tight.

My invention consists in the construction, arrangement and combination of the various parts of the device, whereby the objects contemplated are attained, as hereinafter more fully set forth, pointed out in my claims and illustrated in the accompanying drawings, in which:

Figure 1 shows a side elevation of a fire hydrant equipped with my improved hose coupler. Fig. 2 shows a vertical, sectional view of my hose coupler, and Fig. 3 shows a detail sectional view on the line 3—3 of Fig. 2.

In the accompanying drawings, I have used the reference numeral 10 to indicate an ordinary compression fire hydrant. It is to be understood however that my coupling device may be used with other forms of hydrant, or for connecting sections of hose or pipe. The hydrant 10 is provided with openings for the discharge of water. Around the edge of the openings annular flanges 11 are formed on the hydrant 10. The annular flanges 11 are screw threaded on their inner surfaces.

My improved hose coupler comprises a tube 12 screw threaded at one end and designed to be received at said end into said annular flange 11. The tube 12 is provided at its other end with an annular flange 13, formed on said tube 12 at right angles to the longitudinal axis thereof. The lower half of said flange 13 is constructed with an extension 14 at right angles to said flange 13 and extending away from the body of said tube 12. The extension 14 is provided with an extension 15 adjacent to the central axis of the tube 12, the flange 13 and the extensions 14 and 15 forming a semicircular channel. The inner surface of the extension 15 is slightly beveled so that the distance between it and the surface of the flange 13 is greater at the point adjacent to the body of the tube 12 than at the point farthest away therefrom.

I preferably provide a rubber gasket 16 secured to the outer surface of the annular flange 13. Other materials suitable for making a tight joint may be used in the place of the rubber gasket 16. A tube 17 is secured at one end to a hose 19 in any suitable manner. At the other end the tube 17 is provided with an annular flange 18, the lower half of which is designed to be received within the opening formed by the flange 13 and the extensions 14 and 15, and the upper half of which is designed to be held adjacent to the upper half of the flange 13. The lower half of the annular flange 18 is slightly beveled on the side adjacent to the body of the tube 17 to fit the beveled surface of the extension 15. Hinged at one side of my hose coupler to the flange 13 and the extension 15 is a semi-circular metal channel or covering device 20 designed to fit closely over the upper half of the flanges 18 and 13, and to serve as a cap therefor. The outer surfaces of the flanges 13 and 18 are slightly beveled from the portion of said flanges adjacent to the bodies of the tubes 12 and 17 to the outer edges of said flanges. The inner surfaces of the sides of the covering device 20 are slightly beveled to fit the flanges 18 and 13. On the inside of the covering device 20 in the bottom of the channel or groove formed therein, I place suitable packing material 21 for the purpose of forming a tight joint when the covering device 20 is closed over the flanges 13 and 18. On the outer side of the flange 13 and the extension 15 opposite the joint where the covering device 20 is hinged, is formed a lug 22. On the covering device 20 at a point above and adjacent to the lug 22 when the covering device is in its closed position is formed a lug 23. Pivotally secured to each side of the lug 23 are arms 24 which extend to a point slightly below the lug 22 when the covering device 20 is in its closed position. Pivotally secured between the arms 24 at their lower ends, is a locking lever 25 by which the covering device 20 may be tightly locked over the flanges 13 and 18.

I preferably secure to the hydrant, a chain 26 having at its free end a disk 27 designed to be placed in the groove formed by the flange 13 and the extension 15 to cover the opening in the hydrant when the hose is detached therefrom. As will be seen in Fig. 2, the purpose and effect of forming the flange 18, the extension 15, the flange 13 and the inside of the covering device 20 with beveled surfaces, is to make a tight joint when the covering device 20 is locked over the upper half of the flanges 13 and 18. In attaching a hose to a hydrant with my coupling device, the disk 27 is moved from the groove formed by the flange 13 and the extensions 14 and 15, and the covering device 20 is raised. The lower half of the flange 18 on the tube 17 is inserted in said groove and the covering device 20 is closed and locked by means of the lever 25. The construction of the beveled surfaces heretofore described, provides my coupler with a tighter joint than could otherwise be effected. By means of the packing material 21 substantial resiliency of the covering device 20 is provided to permit the locking by means of the lever 25.

The advantages of my device are found in its simplicity of construction, in its durability, and in the small cost for which it may be made.

My hose coupling device is particularly adapted for use by firemen or others to whom speed in making a coupling is important. Ordinarily in making a coupling it is necessary to unscrew a plug at the fire hydrant and to screw into the opening an attachment on the end of the hose. The saving in time that is accomplished in using my device is obvious.

I claim as my invention:

1. An improved hose coupling comprising a tube designed to be secured to a hose and hydrant, an annular flange formed on one end thereof, a semicircular channel formed on the lower half of said flange, the inner surface of said channel farthest away from the body of said tube being slightly beveled from the bottom of said channel to the upper edge thereof, a tube designed to be secured to a hose, an annular flange thereon, the lower half of said flange being slightly beveled to fit the beveled inner surface of said channel, said flanges being constructed with annular grooves registering with each other and designed to receive packing material, packing material in said grooves, a semicircular channel hinged to one side of said first semicircular channel and designed to fit closely over the upper half of said annular flanges, the upper halves of said annular flanges being slightly beveled on the sides adjacent to the bodies of said tubes, the inner surfaces of said second channel being beveled to fit the beveled surfaces of said annular flanges, packing material in the groove of said second channel.

2. An improved hose coupling comprising a tube designed to be secured to a hose and hydrant, an annular flange formed on one end thereof, a semicircular channel formed on the lower half of said flange, the inner surface of said channel farthest away from the body of said tube being slightly beveled from the bottom of said channel to the upper edge thereof, a tube designed to be secured to a hose, an annular flange thereon, the lower half of said flange being slightly beveled to fit the beveled inner surface of said channel, said flanges being constructed with annular grooves registering with each other and designed to receive packing material, packing material in said grooves, a semicircular channel hinged to one side of said first semicircular channel and designed to fit closely over the upper half of said annular flange, the upper halves of said annular flanges being slightly beveled on the sides adjacent to the bodies of said tubes, the inner surfaces of said second channel being beveled to fit the beveled surface of said annular flanges, packing material in the groove of said second channel, a lug on said first channel opposite the hinged point, a lug on said second channel above said first named lug when the coupler is closed, arms pivotally secured on each side of said second lug extending downwardly on each side of said first lug to a point below the same, and a locking lever pivotally secured between the outer ends of said arms.

Des Moines, Iowa, March 6, 1911.

WILLIAM T. BOYD.

Witnesses:
C. BENNETT,
E. C. REEVES.